Sept. 28, 1971  D. L. GROSHONG  3,608,462
APPARATUS FOR USE IN RECORDING PATHOLOGICAL
AND SURGICAL INFORMATION
Filed April 4, 1963  3 Sheets-Sheet 1

INVENTOR.
BY John W. Pease
ATTORNEY

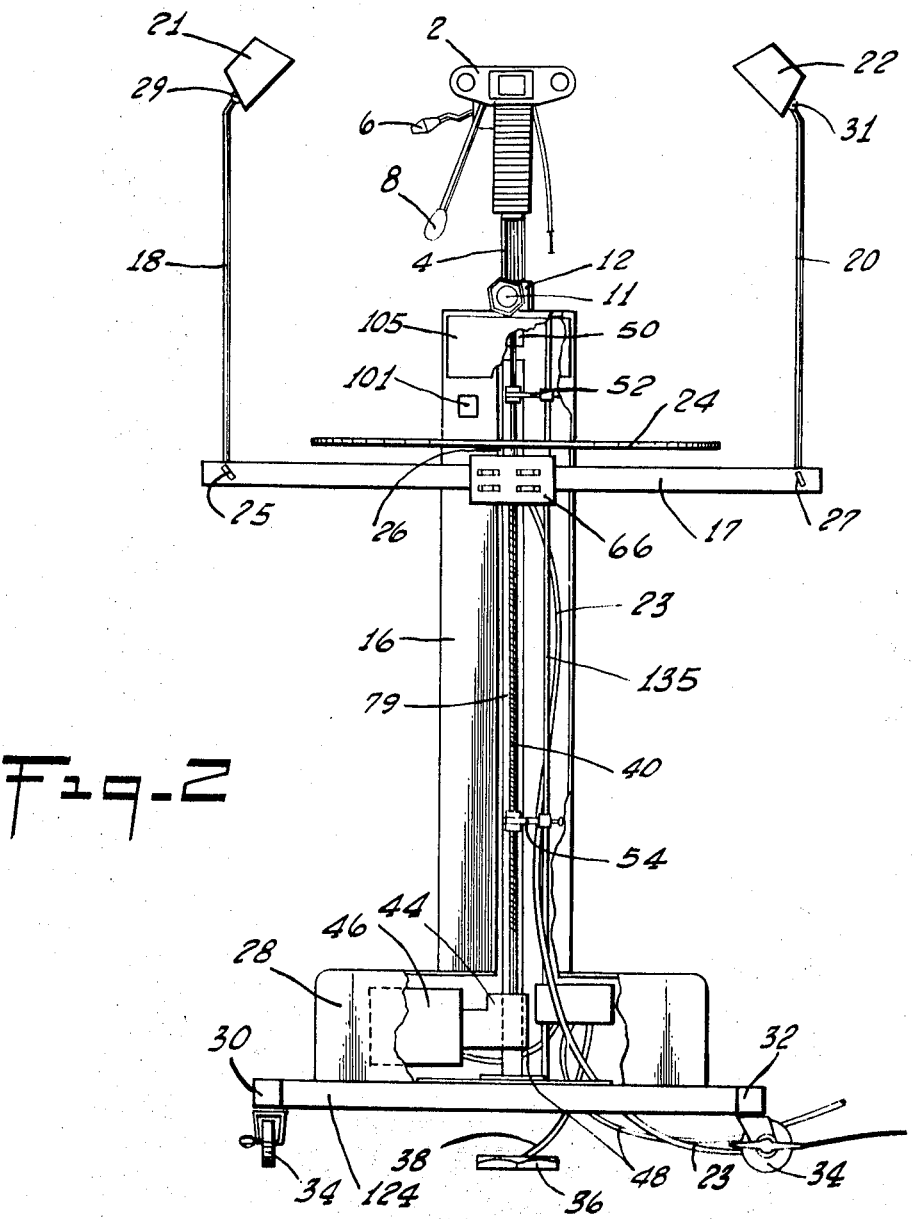

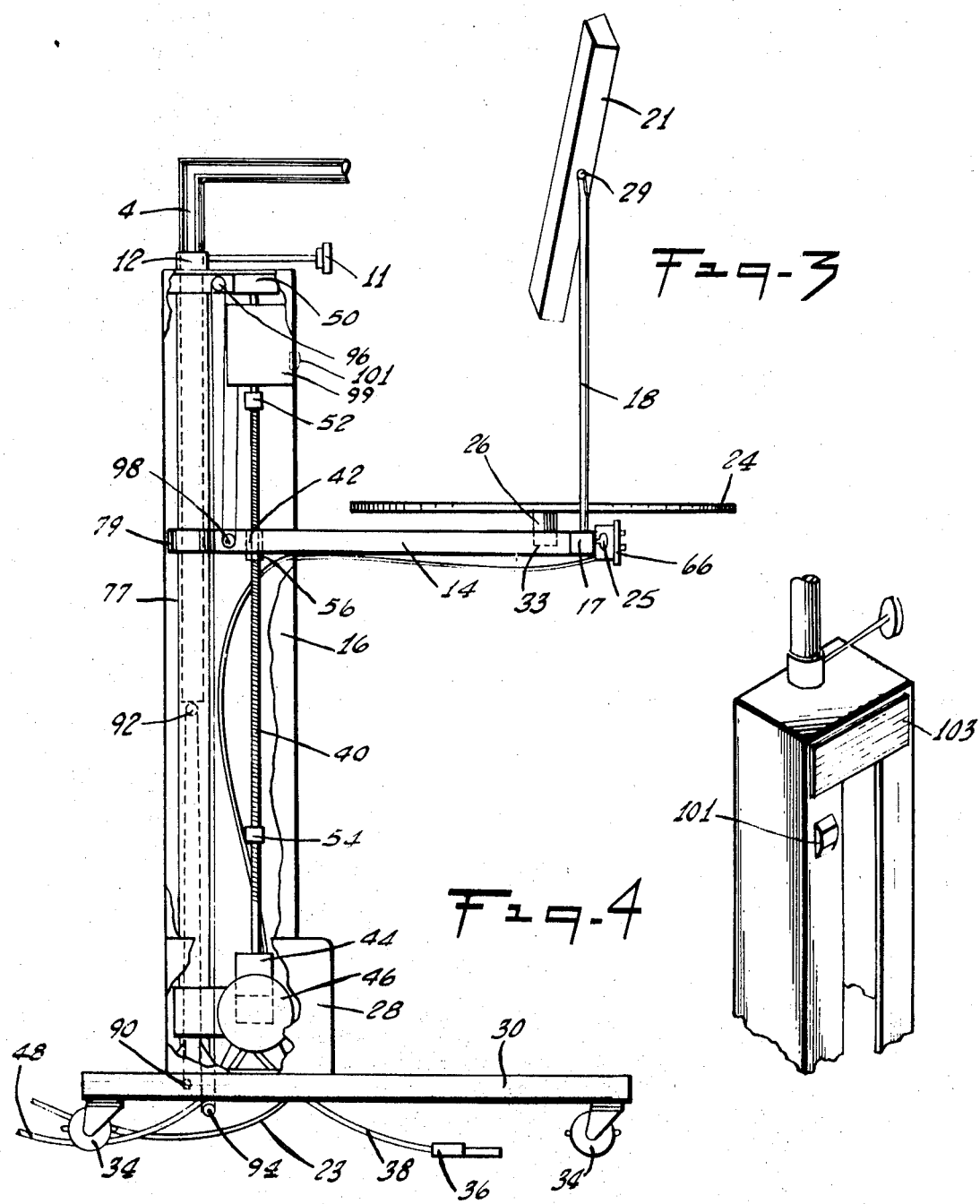

United States Patent Office 3,608,462
Patented Sept. 28, 1971

3,608,462
APPARATUS FOR USE IN RECORDING PATHOLOGICAL AND SURGICAL INFORMATION
David L. Groshong, Los Altos, Calif., assignor to Bruce W. Stilson, San Rafael, Calif., and Guy W. Shoup, New York, N.Y., fractional part interest to each
Filed Apr. 4, 1963, Ser. No. 270,614
Int. Cl. G03b *17/56*
U.S. Cl. 95—86                                                                                                                         1 Claim This invention relates to the provision of an apparatus to be used in the recording of pathological and normal medical information and ancillary tasks incidental thereto by the pathologist or surgeon or other physician, researcher or technician.

Prompt and accurate recording of pathological and surgical visual data in a standardized and reproducible fashion is vital to correlation, analysis, and didactic use of the information thus obtained. The capture of such visual data as is contained in the fine variations found in the appearance of fresh, diseased human tissues is necessitated by and varies with the flow of illustrative material through the pathology or clinical laboratory of any medical institution. This occurs at random and often erratically throughout the working day, reflecting the variability and, to a lesser extent, the chance inherent in autopsy and surgical schedules. Tissues of exceptional teaching value are commonly diagnostic problems, and the considerations of accurate and permanent recording of appearances compete for the pathologist's time with the patient-care-linked necessity for rapid and careful gross and microscopic examination. These considerations beset the pathologist when, for example, his manipulative activity is heightened and his attention dispersed during an autopsy.

The apparatus provides for the positioning of a camera or other device in ideal working relationship to either a tissue-processing work-surface (in the case of surgically excised material) or to the intact human body, dead or alive, supine or ambulatory, for the recording of appearances of tissues and lesions in situ. The colors perceived in the fresh tissues are not permanent; and color itself is often a major diagnostic criterion. The recording for permanent reference of such appearances is frequently required of the pathologist for administrative and forensic reasons, as well as for those reasons related to knowledge of medicine and science. The ethical necessity of honesty, accuracy and adequacy of such permanent transcriptions of the visual data is as critical in this as it is in any other area of medical practice. Appearances distorted by prolonged atmospheric exposure or by inappropriate lighting could mislead the surgeon or other physician consulting such data at a future date, conceivably at a cost reckoned in terms of human life. This invention aids in the obviation of that possibility. In addition to those situations where speed is paramount, this invention is also designed to be used in the more routine photography of regions of the body or of the whole body.

It is axiomatic that, in practice, optimal quantitative use of pathological visual material will be achieved only by the maximization in the standardization of a recording technique. This holds equally true for the qualitative aspects of such recording. Implicit in such maximization of standardization is the highest order of efficiency and dispatch consistent with accuracy.

Devices presently in use in autopsy rooms are not responsive to these needs. The different specimens which are required to be photographed vary greatly in their dimensions of height, width and depth. Reference to three dimensions is made because in addition to the two dimensions of the specimen at right angles to the axis of the camera, there is a depth factor (parallel to the photographic axis) most crucial to focussing activity and to subsequent identification and discrimination of the spatial relations of individual tissue structures. Individually improvised equipment which attempts to meet these needs is in daily use in virtually every sizable hospital in the country. A fixed object platform means either sharply limited maximum field size or the necessity for prolonged stooping or squatting in close-up work, depending on whether the device rests on floor or bench. This dilemma is unavoidable and predicated on immutable laws of optics for all fixed platforms. Technological advances will never compensate for a fixed object platform. Some such devices make use of a low, fixed platform supporting the object to be photographed along with a camera whose height is adjustable in various ways to permit variation in field-size and fineness of detail. Other devices use a fixed or non-adjustable camera mount and an object platform whose height is varied by moving it from slot to slot in a rack comparable to the adjustable shelves in some bookcases. The latter, a commonly employed stratagem, must be cumbersome and space-taking in order to provide for an adequate variety of camera-to-object ranges. Use of such devices is tedious and time-consuming. It is frustrating, for racks seldom embody the ideal range for any given specimen. It is physically fatiguing. For example, as much as two hours may be spent stooping over one of the low, fixed platform devices in the photographic documentation of a deformed infant heart at close range. In addition, the time and energy required in the employment of such devices as are currently in use work markedly to the detriment of the pathologist's performance of other immediate and demanding tasks.

It should be mentioned that autopsy functions are, as a practical matter, generally conducted in relative isolation, and the smaller the medical institution, the fewer aides, if any, there are for assistance in pathological activities. In most hospitals, the pathologist must himself do the photographing of specimens, if it is to be done at all.

There is yet another cast to the autopsy function. In general, only the pathologist knows what to record. The significance of subtle variations perceived in appearances often does not lend itself to ready verbal communication. The pathologist cannot, ethically or even as a practical matter, delegate the responsibility of setting the standards of the quality of recordation.

Most devices now in use are non-mobile, cumbersome and awkwardly structured. This raises a problem that is crucial in any pathology laboratory—they are hard to clean. Their non-mobility, both horizontal and vertical, makes them not adaptable to dissection-table, clinical or other available light photography. They are, in the main, not adaptable to cameras which may be the individual preference of a particular pathologist. The incandescent lights normally in use with them require filters, special film and bulbs and other paraphernalia for realistic color reproduction.

This invention provides for an ease of movement on the part of the physician-operator unknown to this time. The need for any technical photographic skill, experience or education in the operator is completely obviated. Purely mechanical manipulations are reduced to an absolute minimum. The physician's mind and hands are not distracted by gadgetry difficult to master and remain oriented toward biological rather than mechanical or optical problems. His psychomotor skills are thus allowed to concentrate in the area where his unique training lies. Such an arrangement will clearly tend to maximize the ratio of reward to effort.

The apparatus has an automatically movable object platform and is itself mobile. The vertical gap between the object platform and base, coupled with its horizontal mobility, permits the mount assembly to be positioned directly over the autopsy or surgical table to lessen any horizontal travel of specimens destined for photography. It makes use of daylight-type fluorescent bulbs. The similarity of the spectral characteristics of these bulbs to those of currently available film (for example, Kodachrome II) is notable.

Objects of this invention include:

(1) The provision of a vertically adjustable object platform with an adjustable camera support for photography of widely varying sizes of clinical specimens.

(2) The provision of a camera support and object platform which can be utilized in photography of both excised pathological specimens and parts or all of the human body on an autopsy or surgical table at the time of autopsy or surgery.

(3) The provision of a camera mount and rotatable object platform to aid in efficacious recording of the various nuances in appearance of a three-dimensional object resulting from different perspectives.

(4) A camera mount and object platform combination, the object platform being positioned vertically by powered means controlled by a remote foot switch.

(5) A camera mount and object platform for pathological and surgical work which is possessed of a uniform illuminated photographic field created by fixed positioning of the illuminated elements relative to the light.

(6) To provide for a camera mount and object platform which will be readily adjustable at a convenient height for the user thereof, whatever his stature.

(7) To provide a mobile camera mount which can be used to photograph sitting and standing individuals, or portions thereof, for clinical purposes.

(8) The provision of a mobile camera mount with uniform illumination to be used in reproducing pages of journals, books, and photographs for study by, or projection to, groups.

(9) Reduction and elimination of ministerial activities by an engaged pathologist or surgeon.

(10) Elimination of the necessity of an engaged pathologist or surgeon working through a photographically trained but medically unsophisticated assistant.

(11) To provide a camera mount with a removable rotatable object platform which can be shifted from pathological or surgical use, with concomitant contamination and cleaning problems, to immediate use as a reproducing device for printed material which must, in the usual instance, be protected from soiling.

(12) To provide a device to support a camera for pathological or surgical work which requires the use of only the feet of the operating personnel to adjust the camera-to-object distance.

(13) Provision of a medically-oriented camera mount and object platform with automatic control of object-to-camera distance and, therefore, size of the photographic field and acuity of detail of the photograph produced.

(14) Provision of a mobile camera support for pathological use which can be readily cleaned.

A specific embodiment and preferred mode of the invention is illustrated in the drawings. Referring to the drawings:

FIG. 2 is a front elevation and partially cutaway view of the entire mount assembly;

FIG. 3 is a side elevation and partially cutaway view of the entire mount assembly;

FIG. 4 is a detail perspective view of the upper portion of the vertical shaft housing diagonal to both the horizontal and vertical planes.

Figure 1:
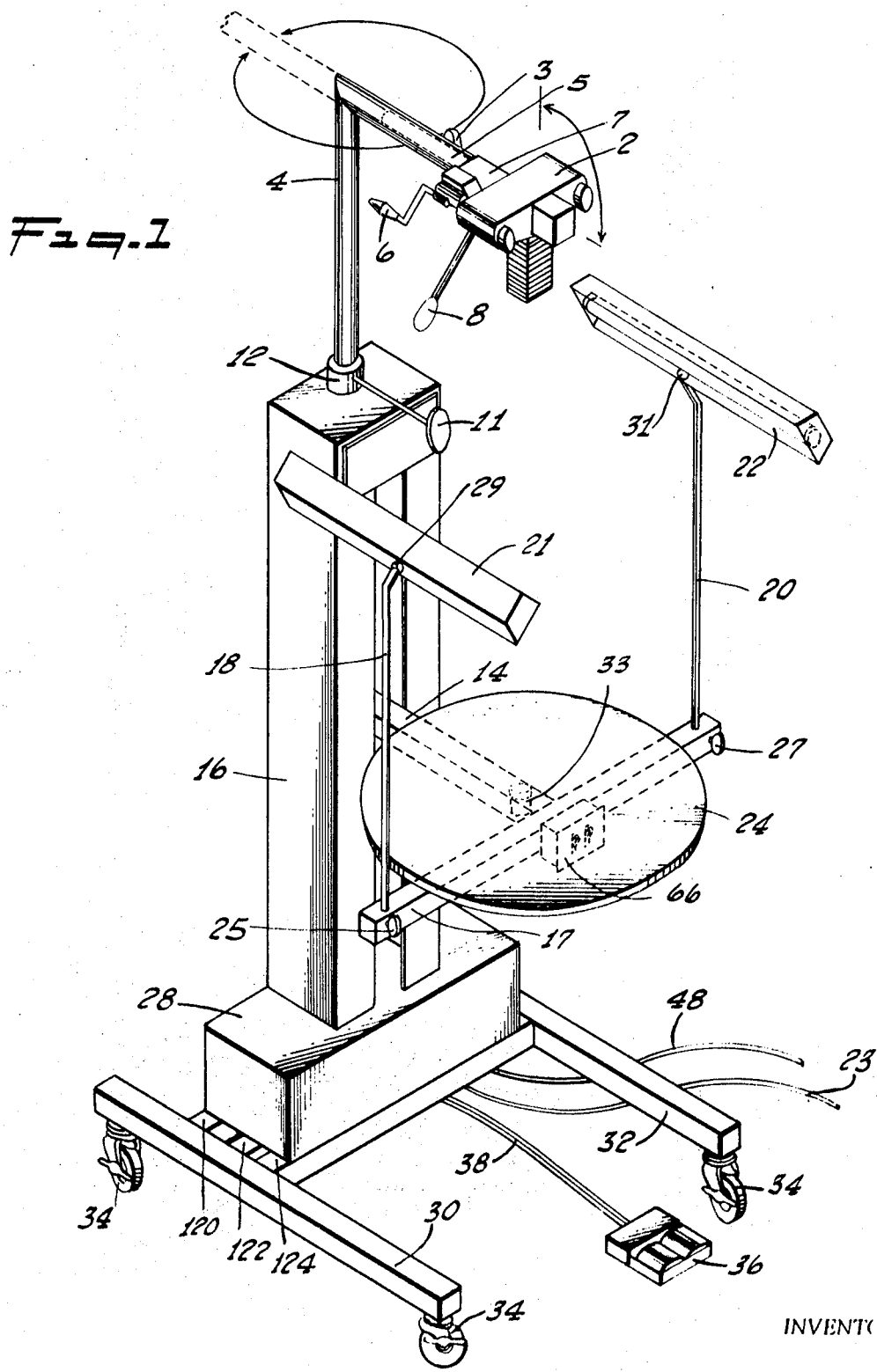
FIG. 1 is a perspective view of the entire mount structure diagonal to both the horizontal and vertical planes.

For a preferred form of the invention, the mount assembly, as pictured in FIGS. 1–3 is in what may be, depending on the nature of use and/or juxtaposition to any autopsy table utilized, a standard operating position. A camera 2, of any type suited for clinical photography, is supported by right-angle member 4, said member 4 terminating in a flange to which is bolted a standard tripod head 7. Said tripod head has as a component a short rod 5 on which the tripod head is movable fore and aft through the means of a handle 6 and clamped at any given position of adjustment by a screw 3. Incorporated into the tripod head 7 is a swivel joint movable by handle 8 to shift the axis of camera orientation in an arc in the plane of right angle member 4. The path of such movement is shown by a line in FIG. 1. Camera and tripod head are joined by the conventional protruding tripod head screw. Right angle member 4 is additionally rotatable about the axis of its vertical portion, the path of said rotation also shown by a line in FIG. 1. Control of this rotational movement is effected by a collar clamp tightened or released by a threaded rod and gripping knob thereof 11 fitting into the side of clamp-containing collar 12. Threaded rod and gripping knob 11 also serve in the vertical adjustment of the camera mount itself, to, for example, position the camera's image screen at precise eye-level height, depending on the stature of the operator then making use of the apparatus. This threaded rod and gripping knob 11 also serve in vertical adjustment of the camera mount when the range of vertical movement provided by the travel of the foot-operated object platform is not sufficient.

The object platform support 14 extends horizontally from the vertical shaft housing 16. At the distant end (furthest from the vertical shaft housing) of the object platform support 14 is attached cross member 17 receiving at its extremities vertical supports 18 and 20 for fixed lighting media 21 and 22 which are mounted in cross member 17 in such a manner as to enable rotation through a horizontal arc. Said rotation is controlled by thumbscrews 25 and 27 at the base of vertical supports 18 and 20. Rotation of the fixed lighting media can also be effected by hinge joints at 29 and 31 vise the thumbscrew means.

The lighting media are connected to a power supply by cord 23 and controlled by individual switches in switchbox 66. The object platform 24 rotates in the horizontal plane by means of a vertical projection 26 from the object platform (see FIG. 3) sunk in a recess 33 below the object platform adapted to receive vertical projection 26. Additionally, a further rotatable object platform (not shown) may be mounted on top of the object platform 24, said further platform being supported by means enabling free rotation on basic object platform 24. Said further platform may also contain a fluorescent element, which may be circular for use in transillumination photography.

Vertical shaft housing 16 is supported by a horizontal base and motor and gear drive assembly housing 28 which is in turn supported by a base plate and vertical brace-assembly 126 (see FIG. 3) resting on crosspieces 120, 122, 124 which in turn are attached to wheel assembly members 30 and 32. To the latter are attached foot-locking wheels 34. Foot switch 36 for object platform adjustment is connected to the drive apparatus by cord 38, said drive apparatus being electrically-powered through cord 38.

The partially cutaway portion of FIG. 2 illustrates the mechanism for powered vertical movement of the object platform. Positioned vertically within the vertical shaft housing 16 is a threaded rod 40. Said threaded rod extends to a gear drive 44 driven by a motor 46 attached to a power supply by cord 48. The threaded rod 40 is supported at the top by end thrust bearing assembly 50 and along its length by side thrust bearing assemblies 52 and 54. Said thrust bearing assemblies are secured to stoprod 135. The channel of passage 42 through the object support arm 14 and reinforcement thereof 56, typically an ajax nut, is adapted to threadedly receive the rod 40.

Said object platform support arm 14 envelopes vertical hollow tube 77 with the sleeve extension 79.

In operation, with power supply on, depressing the appropriate side of footswitch 36 will raise the object platform support arm 14 and the object platform 24 in a vertical direction. Similarly, depressing the other side of footswitch 36 will lower the object platform support arm 14 and the object platform 24. Rotating motion of the horizontal motor shaft (not shown) is translated to rotating motion of the vertical threaded rod 40 by a ninety degree gear drive (not shown). Rotation of the vertical threaded rod causes the upward or downward movement of object platform support arm 14 due to the adaptation of object support arm channel of passage 54 and reinforcement thereof 56 to threadedly receive rod 40. At the upper and lower limits of table travel object platform support 14 trips short arms at adjustable stops, side thrust bearings 52 and 54, imparting motion to stop-rod. This breaks the current to the motor until foot pedal is depressed for motion in the opposite direction.

In FIG. 3 the camera mount assembly is shown in a position designed for utilization in clinical photography with sitting or standing subject material.

Particularly illustrated in FIG. 3, by the side elevation, is the vertical gap between the object platform 24 and wheel attachment member 30 enabling the positioning of the mount assembly directly over the autopsy or surgical table to lessen any horizontal travel of specimens destined for photography.

With particular reference to FIG. 1, the rotation of right angle member 4 through a horizontal arc in clamp-containing collar 12 also permits the positioning of the camera alone directly over the autopsy table for available light photography. Removal by lifting out of the recess 33 of the object platform 24 also enables this over-table attitude to be assumed utilizing the lighting media of the camera mount assembly.

Exposure calibration is facilitated by telemeter cable apparatus, pictured best in FIG. 3. A cable passes in sequence from a point 90 below the base of motor and gear drive assembly 28 through pulley 92 on the lower end of right angle member 4, pulley 94 on the base of motor and gear drive assembly 28, pulley 96 at the top of drive mechanism housing 16, pulley 98 on object support arm 14 and then to a storage drum inside housing 99. The position of object platform support arm 14 (and consequently object support platform 24) is read directly through window 101 (see FIG. 4). The cable is wound on a drum inside housing 99, said drum having annexed to it another drum one-half its diameter, thereon being wound calibrated tape to be read through window 101. A conversion table 103 (see FIG. 4) may be affixed to the face of vertical shaft housing 14 for ready reference.

I claim:

1. A camera stand for use in medical photography comprising a housing containing a vertically positioned receiving tube for a camera support arm on which is mounted a tripod head, said receiving tube having in it a thumbscrew and handle enabling positioning of the camera support arm at any elevation desired, said housing also containing a vertically positioned threaded rod, said threaded rod extending through an arm on which is mounted a camera object platform, the rotation of said threaded rod causing the vertical movement of said camera and object platform, said rotation being effected by a motor and drive assembly at the base of said housing controlled by a foot switch, with the distance from a camera on said tripod head to said camera object platform being measured by telemeter apparatus rigged in the camera stand.

References Cited
UNITED STATES PATENTS

| | | | |
|---|---|---|---|
| 2,107,074 | 2/1938 | Hiniline | 88—24C2 |
| 2,275,687 | 3/1942 | Schulbert | 88—24C33 |
| 2,356,960 | 8/1944 | Wekeman | 88—24CN |
| 2,369,247 | 2/1945 | Pratt | 88—24C33 |
| 2,402,107 | 6/1946 | Wekeman | 88—24C2 |

JOHN M. HORAN, Primary Examiner